US007180685B2

(12) United States Patent
Wang et al.

(10) Patent No.: US 7,180,685 B2
(45) **Date of Patent: *Feb. 20, 2007**

(54) IMAGE PICK-UP LENS SYSTEM

(75) Inventors: Zhuo Wang, Beijing (CN); Guo-Fan Jin, Beijing (CN); Min-Qiang Wang, Beijing (CN); Ji-Yong Zeng, Beijing (CN); Ying-Bai Yan, Beijing (CN)

(73) Assignees: Tsinghua University, Beijing (CN); Hon Hai Precision Industry Co., Ltd. (TW)

( * ) Notice: Subject to any disclaimer, the term of this patent is extended or adjusted under 35 U.S.C. 154(b) by 74 days.

This patent is subject to a terminal disclaimer.

(21) Appl. No.: 10/977,845

(22) Filed: Oct. 29, 2004

(65) Prior Publication Data

US 2005/0280904 A1 Dec. 22, 2005

(30) Foreign Application Priority Data

Jun. 16, 2004 (CN) ........................ 2004 1 0027754

(51) Int. Cl.
*G02B 13/18* (2006.01)
*G02B 9/04* (2006.01)

(52) U.S. Cl. ...................... 359/717; 359/739; 359/793; 359/794; 359/795

(58) Field of Classification Search ................ 359/717, 359/738, 739, 793–795
See application file for complete search history.

(56) References Cited

U.S. PATENT DOCUMENTS

| | | | | |
|---|---|---|---|---|
| 5,940,219 A | 8/1999 | Yamada | 359/642 |
| 6,297,915 B1 | 10/2001 | Kaneko et al. | 359/718 |
| 6,449,105 B1 | 9/2002 | Dou | 359/793 |
| 2003/0117723 A1 | 6/2003 | Shinohara | 359/794 |
| 2003/0193605 A1 | 10/2003 | Yamaguchi | 348/335 |
| 2003/0197953 A1 | 10/2003 | Yamaguchi et al. | |
| 2004/0012861 A1 | 1/2004 | Yamaguchi | 359/772 |
| 2004/0036983 A1 * | 2/2004 | Ninomiya et al. | 359/719 |
| 2006/0056071 A1 * | 3/2006 | Wang et al. | 359/793 |

FOREIGN PATENT DOCUMENTS

| | | |
|---|---|---|
| CN | 1451987 A | 10/2003 |
| EP | 1271215 A2 | 1/2003 |
| EP | 1357414 A1 | 10/2003 |

* cited by examiner

*Primary Examiner*—Evelyn A. Lester
(74) *Attorney, Agent, or Firm*—Morris Manning & Martin LLP; Tim Tingkang Xia, Esq.

(57) ABSTRACT

An image pick-up lens system includes an aperture stop (10), a biconvex first lens (20), and a meniscus-shaped second lens (30) having a concave surface on a side of an object. The aperture stop, the first lens and the second lens are aligned in that order from the object side to an image side. Each of the lenses has at least one aspheric surface, and at least one of the lenses is made from an optical glass. The system satisfies the following condition: (1) $1<T/f<1.6$, wherein f is a focal length of the system, and T is a length from the aperture stop to an image pick-up surface of the image side. The first condition (1) limits the total length of the system in order to provide compactness. The system also satisfies other conditions (2)–(6) as disclosed, in order to provide compactness, improved optical performance, and cost-effectiveness.

18 Claims, 13 Drawing Sheets

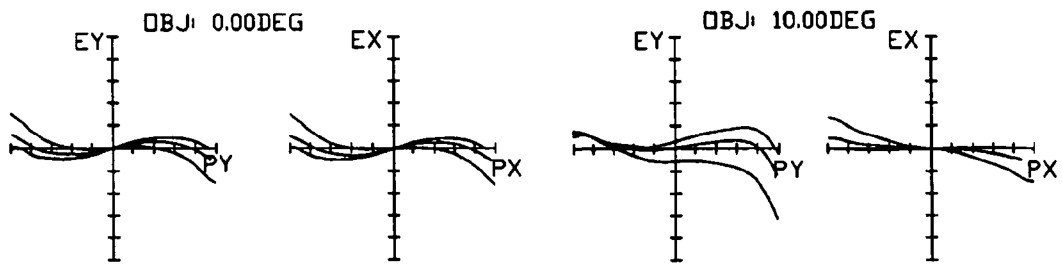
FIG. 3A
FIG. 3B
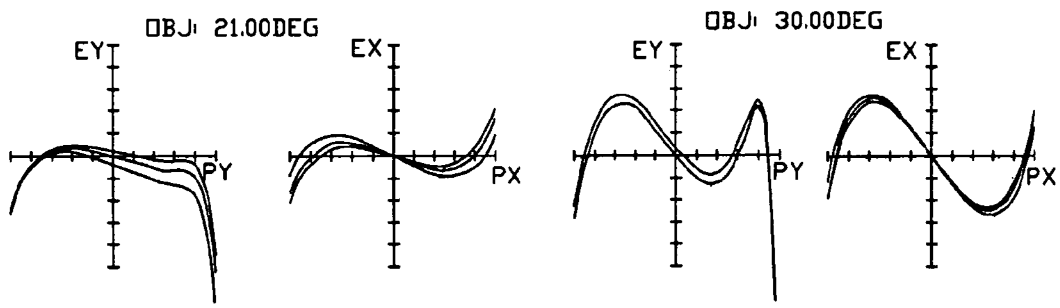
FIG. 3C
FIG. 3D
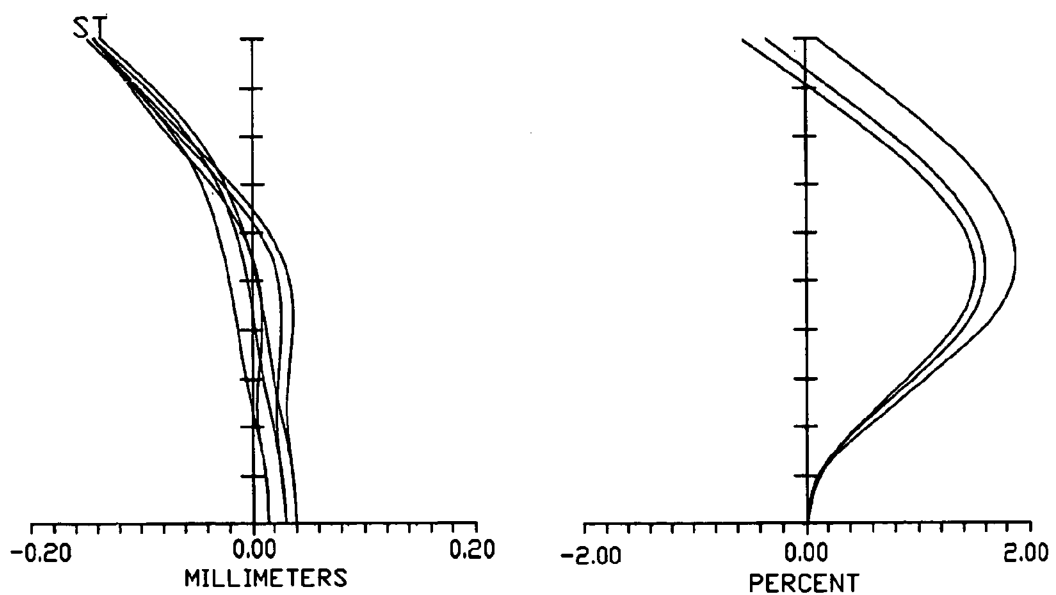
FIG. 4A
FIG. 4B

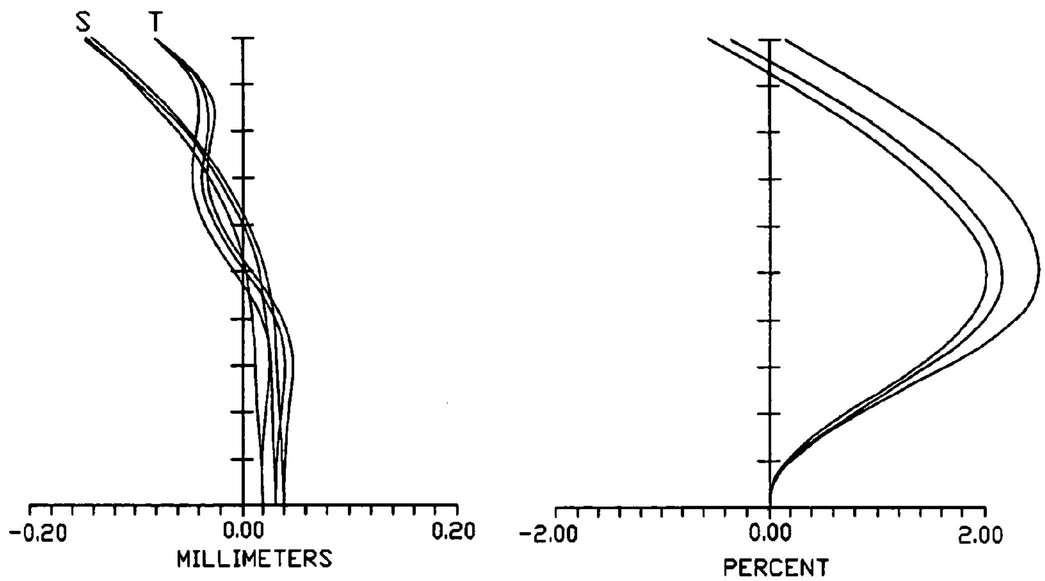
FIG. 9A
FIG. 9B
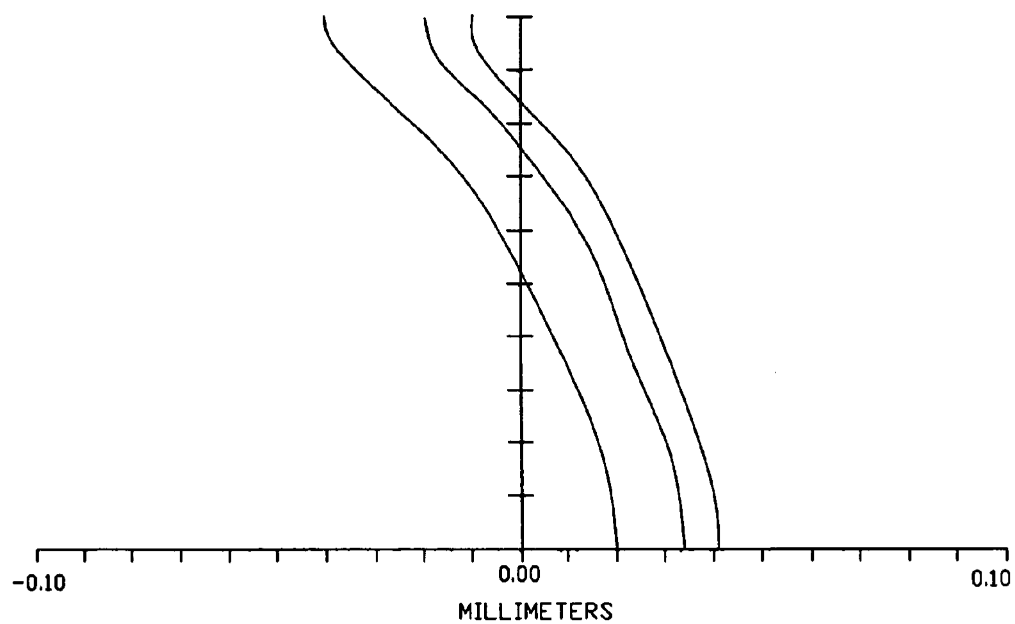
FIG. 10

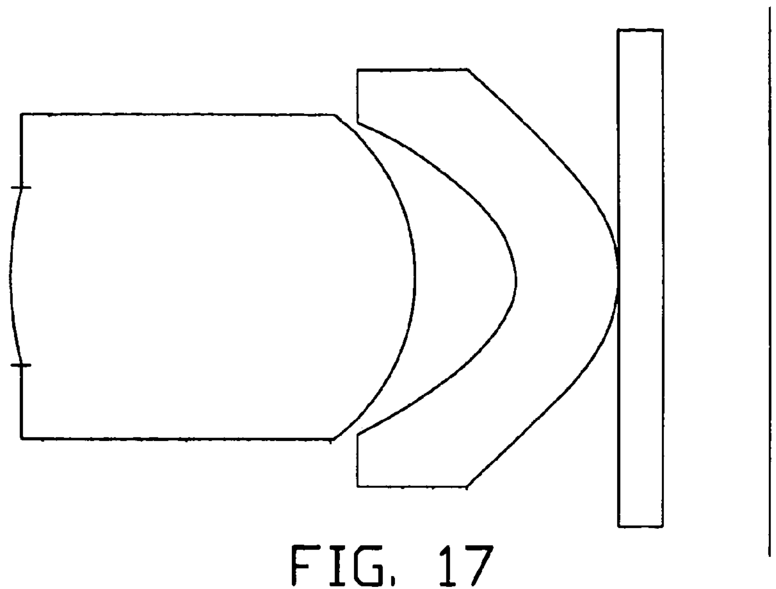
FIG. 17
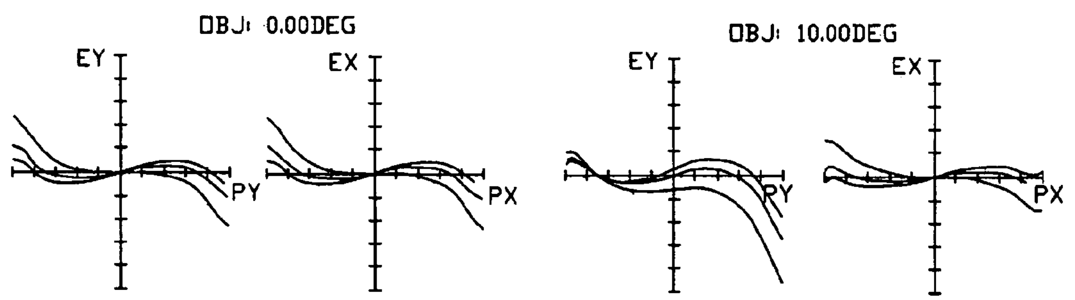
FIG. 18A
FIG. 18B
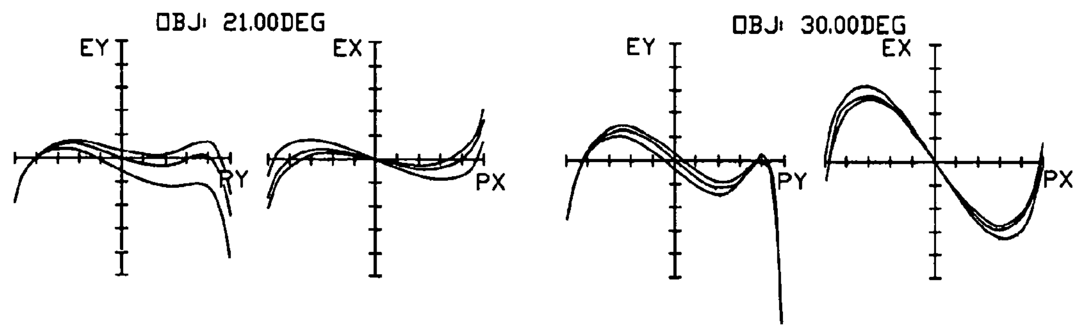
FIG. 18C
FIG. 18D

IMAGE PICK-UP LENS SYSTEM

TECHNICAL FIELD

The present invention relates to an image pick-up lens system which projects an image of an object onto an image pick-up surface, the image pick-up lens system being suitable for use in products such as camera modules.

BACKGROUND

In recent years, camera modules for taking photos have begun to be incorporated in mobile terminals such as mobile phones and lap-top computers. Downsizing the camera modules is a prerequisite for enhancing the portability of these apparatuses. The camera module operates with an image pickup device such as a CCD (Charged Coupled Device) or a CMOS (Complementary Metal Oxide Semiconductor). Recently, a pixel having the size of approximately a few micrometers has become commercially feasible, and an image pickup device with high resolution and a compact size can now be commercialized. This is accelerating the demand for downsizing of image pick-up lens systems so that they are able to be suitably used with miniaturized image pick-up devices. It is also increasing expectations of cost reductions in image pick-up lens systems, commensurate with the lower costs enjoyed by modem image pickup devices. All in all, an image pick-up lens system needs to satisfy the oft-conflicting requirements of compactness, low cost, and excellent optical performance.

Compactness means in particular that a length from a lens edge of the lens system to an image pick-up surface should be as short as possible.

Low cost means in particular that the lens system should include as few lenses as possible; and that the lenses should be able to be formed from a resin or a plastic and be easily assembled.

Excellent optical performance can be classified into the following five main requirements:

First, a high brightness requirement, which means that the lens system should have a small F number (FNo.) Generally, the FNo. should be 2.8 or less.

Second, a wide angle requirement, which means that half of the field of view of the lens system should be 30° or more.

Third, a small incident angle of a chief ray on an image pick-up surface is required, because too wide an incident angle of the chief ray seriously affects illumination of edges of the field of view.

Fourth, a uniform illumination on the image surface requirement, which means that the lens system has few eclipses and/or narrows down an angle of incidence onto an image pick-up device.

Fifth, a high resolution requirement, which means that the lens system should appropriately correct fundamental aberrations such as spherical aberration, coma aberration, curvature of field, astigmatism, distortion, and chromatic aberration.

In a lens system which satisfies the low cost requirement, a single lens made from a resin or a plastic is desired. Typical such lens systems can be found in U.S. Pat. No. 6,297,915B1 and EP Pat. No. 1271215A2. However, even if the lens has two aspheric surfaces, it is difficult to achieve excellent optical performance, especially if a wide angle such as 70° is desired. Thus, the single lens system can generally only be used in a low-resolution image pick-up device such as a CMOS. In addition, a thick lens is generally used for correcting aberrations. Thus, a ratio of a total length of the lens system to a focal length of the lens (L/f) is about 2. In other words, it is difficult to make the lens system compact.

In a lens system which satisfies the excellent optical performance requirement, three or even more lenses are desired. A typical three-lens system can be found in U.S. Pat. No. 5,940,219. A typical four-lens system can be found in U.S. Pat. Application Publication No. 2004/0012861. However, the addition of extra lenses increases costs proportionately.

In order to satisfy all the requirements of compactness, low cost and excellent optical performance, it is commonly believed that a two-lens system is desirable.

A well-known two-lens system is the retro-focus type lens system. A typical such lens system can be found in U.S. Pat. No. 6,449,105B1. The lens system comprises, from an object side to an image side, a first meniscus lens having negative refracting power and a convex surface on the object side, a stop, and a second meniscus lens having positive refracting power and a convex surface on the image side. The lens system helps correct wide angle aberrations. However, a shutter is positioned between the second lens and the image side, which adds to the distance between the second lens and the image side. Thus, the compactness of the lens system is limited.

In order to overcome the above described problems, an image pick-up lens system generally employs two lenses which are made from plastic or resin and which have four aspheric surfaces. A typical configuration of such system can be found in U.S. Pat. Application Publication No. 2004/0036983 and EP Pat. No. 1357414A1. The system can satisfy the compactness and low cost requirements. In addition, the system can provide a resolution of 300,000 pixels.

However, a ratio of a total length of such system to a total focal length of the lenses (L/f) is generally about 2. The smallest ratio obtainable is 1.7, which still constitutes a limitation on the compactness of the lens system. In addition, it is difficult to improve resolution due to inherent properties of the materials of which the lenses are made. In one aspect, for cost reduction, the two lenses are made from a same plastic or resin material. This makes it difficult to correct lateral chromatic aberrations. In another aspect, because there are only a few varieties of plastic and resin materials which can be suitably used to make lenses, even if the two lenses are made from a different plastic or resin material, the range of variation of optical properties of the two lenses is limited. For example, one lens may be made from polymethyl methacrylate (PMMA) having a low refractive index and low color dispersion, and the other lens may be made from polycarbonate (PC) having a high refractive index and high color dispersion. In such case, the range of variation of the refract indexes and the Abbe constants is narrow. Typically, the refractive indexes vary in the range from 1.49 to 1.59, and the Abbe constants vary in the range from 30 to 55. This makes it difficult to effectively correct lateral chromatic aberration. Furthermore, compared with optical glass, the optical properties of a plastic or resin material are inferior. Such optical properties include optical transmission, wavelength range for light transmittance, temperature resistance, and humidity resistance. Thus, it is difficult to apply the image pick-up lens system with lenses made from plastic or resin materials to products requiring a resolution of 1,000,000 pixels or more. On the other hand, if the two lenses are made of optical glass, it is unavoidable that the total cost of the system is increased.

Therefore, a low-cost image pick-up lens system which has a compact configuration and excellent optical performance and which can be used in products having over 1,000,000 pixels resolution is desired.

SUMMARY OF THE INVENTION

Accordingly, an object of the present invention is to provide an image pick-up lens system which has a relatively short total length.

Another object of the present invention is to provide an image pick-up lens system which has excellent optical performance and can be used in products having over 1,000,000 pixels resolution.

To achieve the above-described objects, an image pick-up lens system in accordance with the present invention comprises an aperture stop, a biconvex first lens, and a meniscus-shaped second lens having a concave surface on a side of an object. The aperture stop, the first lens and the second lens are aligned in that order from the object side to an image side. Each of the lenses has at least one aspheric surface, and at least one lens is made from an optical glass. According to a first aspect, the following condition is satisfied:

$$1<T/f<1.6, \quad (1)$$

wherein, f is a focal length of the system, and T is a length from the aperture stop to an image pick-up surface of the image side.

According to a second aspect, preferably, both surfaces of the first lens are aspheric, and the following condition is satisfied:

$$d/R2>1.6, \quad (2)$$

wherein, R2 is an absolute value of a radius of curvature of a second surface of the first lens on the image side, and d is a thickness of the first lens.

According to a third aspect, the following conditions are satisfied:

$$0.6<f1/f<0.8, \text{ and} \quad (3)$$

$$0.1<R2/R1<0.8 \quad (4)$$

wherein, f1 is a focal length of the first lens, and R1 is an absolute value of a radius of curvature of a first surface of the first lens on the object side.

Further, to correct field curvature, each of the first and second lenses each is aspheric on both surfaces thereof, and the following condition is satisfied:

$$0.7<(1/R3)/(1/R1+1/R2+1/R4)<0.9 \quad (5)$$

wherein, R3 is an absolute value of a radius of curvature of a third surface of the second lens on the object side, and R4 is an absolute value of a radius of curvature of a fourth surface of the second lens on the image side.

Further still, the first lens is made from an optical glass, and the second lens is made from a plastic or a resin. To correct chromatic aberration, the Abbe constant ν1 of the first lens and the Abbe constant ν2 of the second lens preferably satisfy the following condition:

$$\nu 1-\nu>35. \quad (6)$$

Because the first lens is positioned adjacent the aperture stop and has at least one aspheric surface, the image pick-up lens system can appropriately correct spherical and coma aberrations. In addition, because the second lens is positioned away from the aperture stop and has at least one aspheric surface, different chief rays of different field angles can have very different corresponding projection heights at the second lens. Therefore, the system can appropriately correct astigmatism, field curvature and distortion, all of which are related to the field angle. Furthermore, the fourth surface of the second lens has gradually varying refraction from a central portion thereof near an optical axis of the system to a peripheral edge portion thereof. Thus, the central portion of the second lens diverges light rays and the peripheral edge portion of the second lens converges light rays, so that the meridional/sagittal sections easily coincide. For all the above reasons, the optical image performance in wide angles of the system is enhanced. Moreover, because at least one of the first and second lenses is made from an optical glass, and because optical glass has optical properties superior to those of plastics or resins, the optical performance of the system is further improved. Thus the system achieves low cost for mass manufacture as well as improved optical performance, which makes the system suitable for use in high-resolution products having over 1,000,000 pixels resolution.

Other objects, advantages and novel features of the present invention will become more apparent from the following detailed description when taken in conjunction with the accompanying drawings, in which:

BRIEF DESCRIPTION OF THE DRAWINGS

FIGS. 3–6 are graphs respectively showing transverse ray fan plots, and field curvature and distortion, longitudinal spherical aberration, and lateral chromatic aberration curves for the system in accordance with the first exemplary embodiment of the present invention;

FIGS. 8–11 are graphs respectively showing transverse ray fan plots, and field curvature and distortion, longitudinal spherical aberration, and lateral chromatic aberration curves for the system in accordance with the second exemplary embodiment of the present invention;

FIG. 17 is a schematic, cross-sectional view of a fourth exemplary embodiment of the image pick-up lens system in accordance with the present invention, and showing an image pick-up surface;

FIGS. 18–21 are graphs respectively showing transverse ray fan plots, and field curvature and distortion, longitudinal spherical aberration, and lateral chromatic aberration curves of the system in accordance with the fourth exemplary embodiment of the present invention;

DETAILED DESCRIPTION OF PREFERRED EMBODIMENTS OF THE INVENTION

Figure 1:
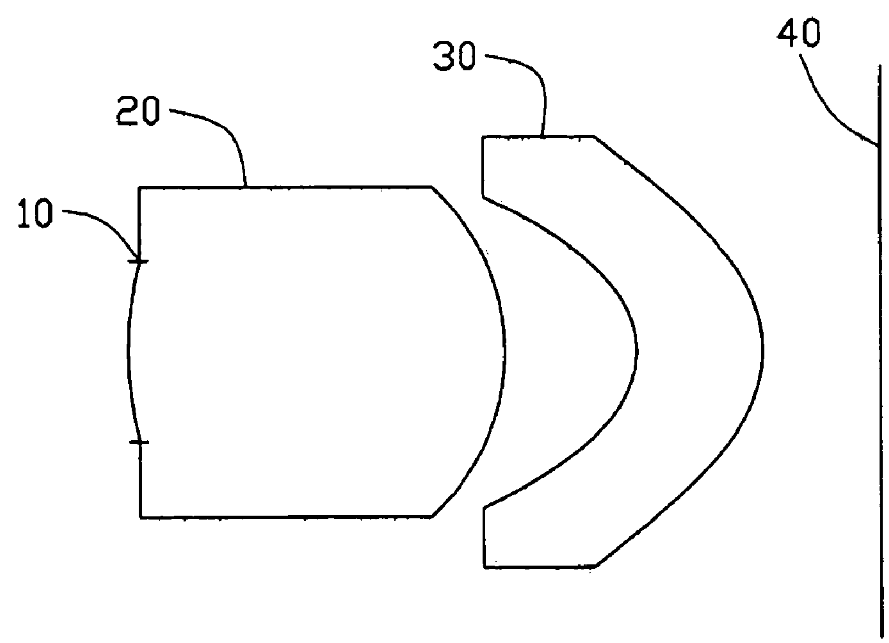
FIG. 1 is a schematic, cross-sectional view of an image pick-up lens system in accordance with the present invention, and showing an image pick-up surface.

FIG. 1 shows a schematic configuration of an image pick-up lens system in accordance with the present invention. The image pick-up lens system comprises an aperture stop 10, a biconvex first lens 20, and a meniscus-shaped second lens 30 having a concave surface on a side of an object. The aperture stop 10, the first lens 20 and the second lens 30 are aligned in that order from the object side to an image side. The first and the second lenses 20, 30 each have at least one aspheric surface. At least one of the first and second lenses 20, 30 is made from an optical glass.

The aperture stop 10 is arranged closest to the object in order to narrow down an incident angle of chief rays onto an image pick-up surface 40 located at the image side. In addition, this arrangement of the aperture stop 10 helps shorten a total length of the system. For further cost reduction, the aperture stop 10 is preferably formed directly on a first surface (not labeled) of the first lens 20 on the object side. In practice, a portion of the first surface of the first lens 20 through which light rays are not transmitted is coated with a black material, which functions as the aperture stop 10.

In order to provide compactness and excellent optical performance, the system satisfies the following condition:

$$1<T/f<1.6, \qquad (1)$$

wherein, f is a focal length of the system, and T is a length from the aperture stop 10 to the image pick-up surface 40. The first condition (1) is for limiting the total length of the system. The total length of the system is directly related to optical performance of the system, especially when controlling the incident angle of the chief rays in order to achieve an approximate image side telecentric characteristic light path. With such light path, the system can improve optical performance as well as achieve compactness.

Preferably, both the first surface and a second surface (not labeled) of the first lens 20 on the image side are aspheric, and the following condition is satisfied:

$$d/R2>1.6, \qquad (2)$$

wherein, R2 is an absolute value of a radius of curvature of the second surface of the first lens 20, and d is a thickness of the first lens 20. The second condition (2) is for lessening an incident angle of the chief rays. Too wide an incident angle of the chief rays can seriously affect illumination of edges of the field of view. The smaller the incident angle of the chief rays is, the larger the ratio of d/R2 is. In other words, the thicker the first lens 20 is, the longer the total length of the system is. Thus, to make sure that the incident angle of the chief rays is 20° in wide angle (30° ), the first lens 20 must satisfy the second condition.

In addition, the first lens 20 preferably satisfies the following conditions:

$$0.6<f1/f<0.8, \text{and} \qquad (3)$$

$$0.1<R2/R1<0.8, \qquad (4)$$

wherein, f1 is a focal length of the first lens 20, and R1 is an absolute value of a radius of curvature of the first surface of the first lens 20 on the object side. The third condition (3) is for correcting monochromatic aberrations, and providing both compactness and a desirable distribution of refracting power. In one aspect, when the ratio f1/f is above the lower limit of 0.6, the system provides satisfactory total refracting power and keeps the high-order spherical aberration, high-order coma and lateral chromatic aberration of the system in a controlled range. In another aspect, when the ratio f1/f is below the upper limit of 0.8, the system is compact and provides satisfactory total refracting power. The fourth condition (4) governs a distribution of refracting power for the first lens 20, in order to correct monochromatic aberrations.

The concave surface of the second lens 30 is defined as a third surface (not labeled). The second lens 30 is aspheric on both surfaces. The first lens 20 and the second lens 30 satisfy the following condition:

$$0.7<(1/R3)/(1/R1+1/R2+1/R4)<0.9, \qquad (5)$$

wherein, R3 is an absolute value of a radius of curvature of the third surface of the second lens 30, and R4 is an absolute value of a radius of curvature of a fourth surface (not labeled) of the second lens 30 on the image side.

The fifth condition (5) is for correcting field curvature and obtaining a flat field. In one aspect, when the ratio (1/R3)/(1/R1+1/R2+1/R4) is above the lower limit of 0.7, the negative Petzval's Sum produced by the third surface of the second lens 30 can compensate the total positive Petzval's Sum produced by the first and second surfaces of the first lens 20 and the fourth surface of the second lens 30. Thus, it is relatively easy to correct field curvature of the system. In another aspect, when the ratio (1/R3)/(1/R1+1/R2+1/R4) is below the upper limit of 0.9, the negative refracting power produced by the third surface of the second lens 30 can effectively compensate the positive coma and lateral chromatic aberration produced by the first lens 20. In addition, the radius of curvature R3 of the third surface of the second lens 30 is not so small as to increase the high-order aberrations of the system, and the negative refractive power provided by R3 can correct the lateral chromatic aberration of the first lens 20. Furthermore, the radius of curvature R3 of the third surface of the second lens 30 has the smallest absolute value among the four absolute values of radiuses of curvature R1, R2, R3 and R4 of the first and second lenses 20, 30. Thus, in order to correct field curvature without producing high-order aberrations, the third surface of the second lens 30 is concave relative to the aperture stop 10.

Also, in order to appropriately correct the chromatic aberration of the system, the Abbe constant ν1 of the first lens 20 and the Abbe constant ν2 of the second lens 30 preferably satisfy the following condition:

$$\nu1-\nu2>35, \qquad (6)$$

Preferably, the first lens 20 is made from an optical glass, and the second lens 30 is made from a plastic or a resin.

Further, the fourth surface of the second lens 30 preferably has a gradually varying refraction from a central portion thereof near an optical axis of the system to a peripheral edge portion thereof. Thus, a central portion of the second lens 30 diverges light rays and a peripheral edge portion of the second lens 30 converges light rays, so that meridional/sagittal sections easily coincide. This feature further enhances the optical image performance in wide angles of the system.

The above explanations outline fundamental constituent features of the present invention. Examples of the system will be described below with reference to FIGS. 2–26. It is to be understood that the invention is not limited to these examples. The following are symbols used in each exemplary embodiment.

T: length from the aperture stop 10 to the image pick-up surface 40 f: focal length of the system

FNo: F number

ω: half field angle

2ω: field angle

R: radius of curvature d: distance between surfaces on the optical axis of the system Nd: refractive index of lens ν: Abbe constant In each example, the first and second surfaces of the first lens 20 and the third and fourth surfaces of the second lens 30 are aspheric. The shape of the aspheric surface is provided by expression 1 below. Expression 1 is based on a Cartesian coordinate system, with the vertex of the surface being the origin, and the optical axis extending from the vertex being the x-axis.

Expression 1:

$$x = \frac{ch^2}{1+\sqrt{1-(k+1)c^2h^2}} + \sum A_i h^i$$

where, h is a height from the optical axis to the surface, c is a vertex curvature, k is a conic constant, and $A_i$ are i-th order correction coefficients of the aspheric surfaces.

Figure 2:
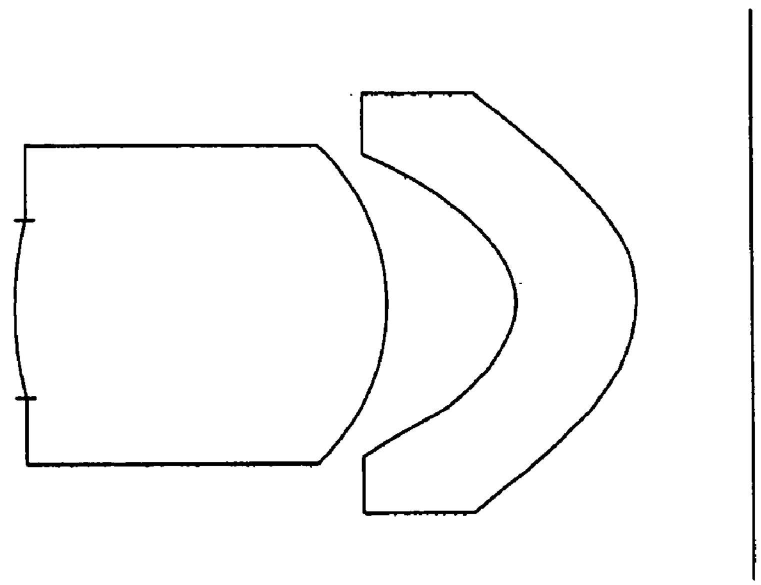
FIG. 2 is a schematic, cross-sectional view of a first exemplary embodiment of the image pick-up lens system in accordance with the present invention, and showing an image pick-up surface.
Figure 5:
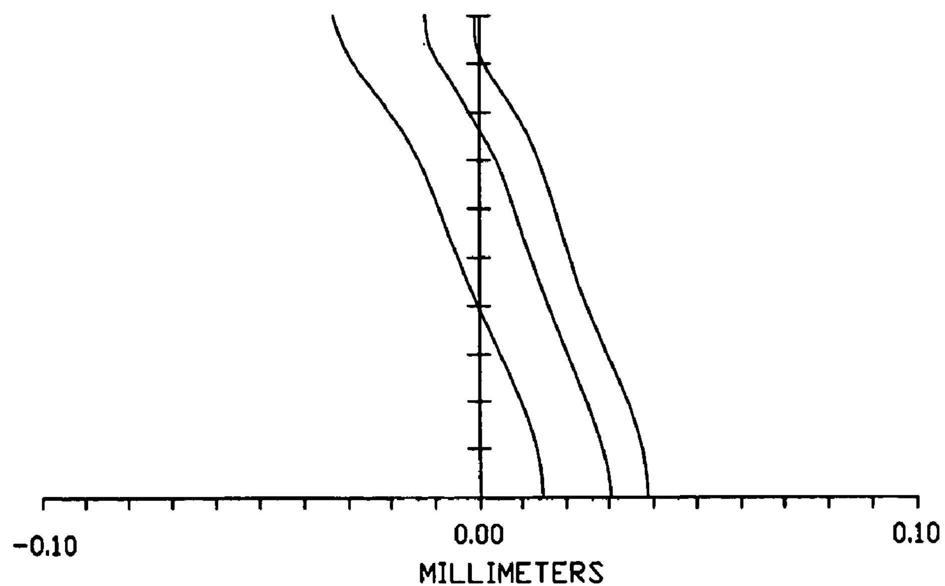
Figure 6:
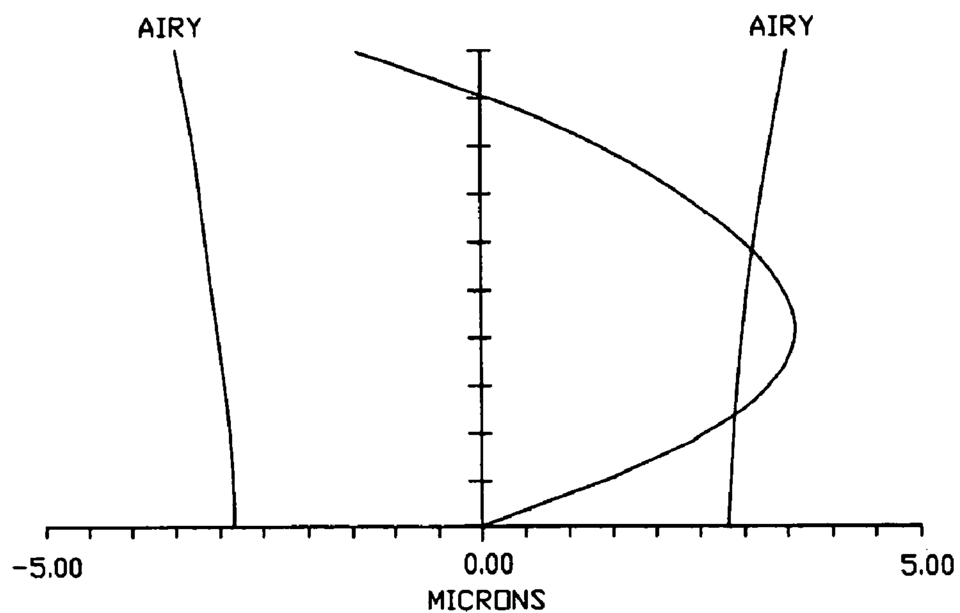

FIG. 2 shows a schematic view of a configuration of the image pick-up lens system of the first exemplary embodiment in accordance with the present invention.

Tables 1 and 2 show lens data of Example 1. In the lens data shown below, e shows powers of 10; that is, for example, 2.5e−0.3 means $2.5\times10^{-3}$.

TABLE 1 f = 4.46 mm T = 6.59 mm FNo = 2.80 ω = 30°

| Surface No. | R (mm) | D (mm) | Nd | ν | k |
|---|---|---|---|---|---|
| Stop 10 | infinite | −0.093 | | | 0 |
| 1st surface | 3.373493 | 3.305366 | 1.486560 | 84.467621 | 3.98606 |
| 2nd surface | −1.788958 | 1.151782 | | | 0.05006632 |
| 3rd surface | −0.7536329 | 1.100337 | 1.597314 | 23.081100 | −0.8118792 |
| 4th surface | −1.065676 | | | | −1.520515 |

TABLE 2

| Surface No. | 1st surface | 2nd surface | 3rd surface | 4th surface |
|---|---|---|---|---|
| Aspherical coefficient | A2 = 0 | A2 = 0 | A2 = 0 | A2 = 0 |
| | A4 = −0.019495053 | A4 = 0.025867676 | A4 = 0.04210578 | A4 = −0.022457345 |
| | A6 = −0.021683085 | A6 = −0.0007816618 | A6 = 0.01061825 | A6 = 0.0016856174 |
| | A8 = 0.025965519 | A8 = −0.00022579295 | A8 = 0.0018672649 | A8 = 0.00027646151 |
| | A10 = −0.023355697 | A10 = 0.00021378328 | A10 = −0.00033103557 | A10 = 3.9862824e−005 |
| | A12 = 0.005350561 | A12 = −3.1757598e−005 | A12 = −6.6735338e−005 | A12 = −9.8809949e−006 |
| | A14 = 0 | A14 = 0 | A14 = 0 | A14 = 0 |
| | A16 = 0 | A16 = 0 | A16 = 0 | A16 = 0 |

FIGS. 3–6 are graphs of aberrations (transverse ray fan plots, and field curvature/distortion, longitudinal spherical aberration and lateral chromatic aberration curves) of the image pick-up lens system of Example 1. FIGS. 3A–3D respectively show aberrations curves of meridional/sagittal sections in 0°, 10°, 21° and 30° field angles. FIGS. 4A and 4B respectively show field curvature and distortion curves. The first lens 20 is made from the FK2 type of china glass, and the second lens 30 is made from a polycarbonate marketed under the brand name Lexan-HF by U.S. General Electric Corporation.

Figure 7:
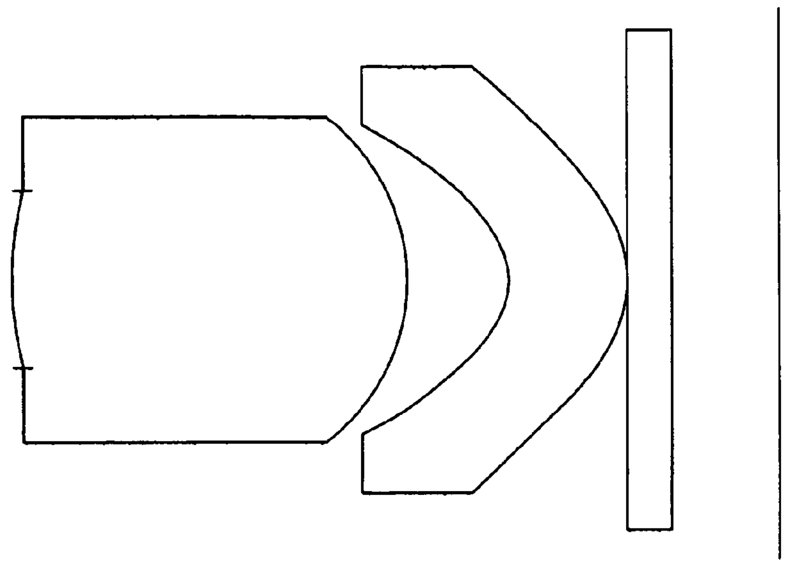
FIG. 7 is a schematic, cross-sectional view of a second exemplary embodiment of the image pick-up lens system in accordance with the present invention, and showing an image pick-up surface.
Figure 8A:
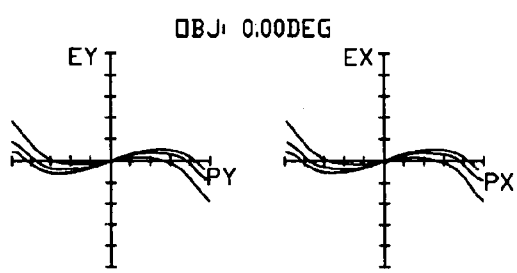
Figure 8B:
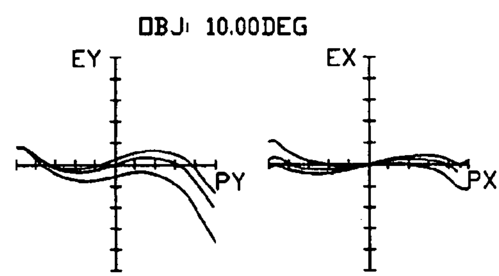
Figure 8C:
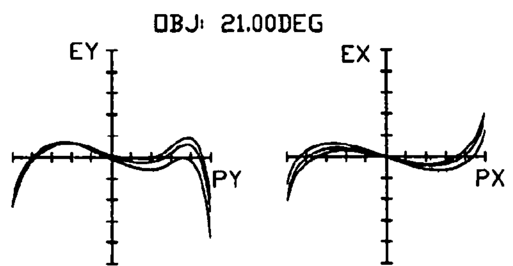
Figure 8D:
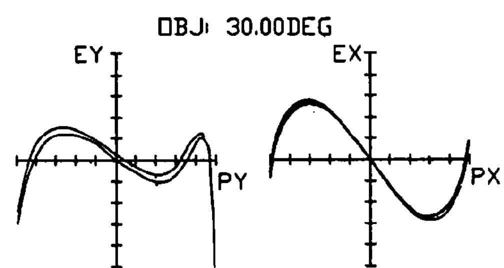
Figure 11:
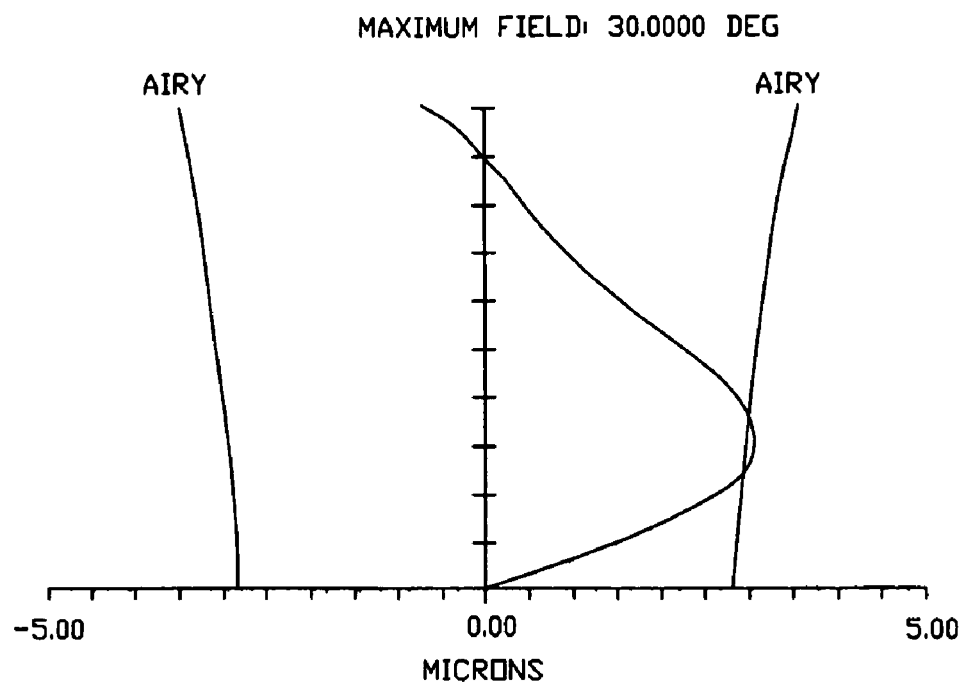

FIG. 7 shows a schematic view of a configuration of the image pick-up lens system of the second exemplary embodiment in accordance with the present invention. In Example 2, a cover glass (not labeled) is provided between the second lens 30 and the image pick-up surface 40.

Lens data of Example 2 are shown in tables 3 and 4. In the lens data shown below, e shows powers of 10; that is, for example, 2.5e−0.3 means $2.5\times10^{-3}$.

TABLE 3

| f = 4.46 mm T = 6.98 mm FNo = 2.80 ω = 30° | | | | | |
|---|---|---|---|---|---|
| Surface No. | R (mm) | D (mm) | Nd | ν | k |
| Stop 10 | infinite | −0.09 | | | 0 |
| 1st surface | 3.43686 | 3.612505 | 1.496997 | 81.608364 | −5.566218 |
| 2nd surface | −1.592066 | 0.9454762 | | | −0.442907 |
| 3rd surface | −0.6794645 | 1.078636 | 1.597314 | 23.000000 | −1.118023 |
| 4th surface | −1.04275 | 0 | | | −1.34745 |

TABLE 4

| Surface No. | | 1st surface | 2nd surface | 3rd surface | 4th surface |
|---|---|---|---|---|---|
| Aspherical coefficient | | A2 = 0 | A2 = 0 | A2 = 0 | A2 = 0 |
| | | A4 = 0.01256408 | A4 = 0.039726394 | A4 = 0.029444327 | A4 = 0.0056825755 |
| | | A6 = −0.017579476 | A6 = −0.017910876 | A6 = 0.011957211 | A6 = 0.0026463237 |
| | | A8 = 0.025966687 | A8 = 0.012506457 | A8 = −0.015282696 | A8 = −0.00027915525 |
| | | A10 = −0.023355697 | A10 = −0.0054466933 | A10 = 0.00038127686 | A10 = −0.0002995309 |
| | | A12 = 0.005350561 | A12 = 0.0007567143 | A12 = 0.00051306693 | A12 = 5.2311272e−005 |
| | | A14 = 0 | A14 = 0 | A14 = 0 | A14 = 0 |
| | | A16 = 0 | A16 = 0 | A16 = 0 | A16 = 0 |

FIGS. 8–11 are graphs of aberrations (transverse ray fan plots, and field curvature/distortion, longitudinal spherical aberration and lateral chromatic aberration curves) of the image pick-up lens system of Example 2. FIGS. 8A–8D respectively show aberrations curves of meridional/sagittal sections in 0°, 10°, 21° and 30° field angles. FIGS. 9A and 9B respectively show field curvature and distortion curves. The first lens 20 is made from the FCD1 type of molding glass available from Japanese Hoya Corporation, and the second lens 30 is made from the polycarbonate marketed under the brand name Lexan-HP by U.S. General Electric Company.

Figure 12:
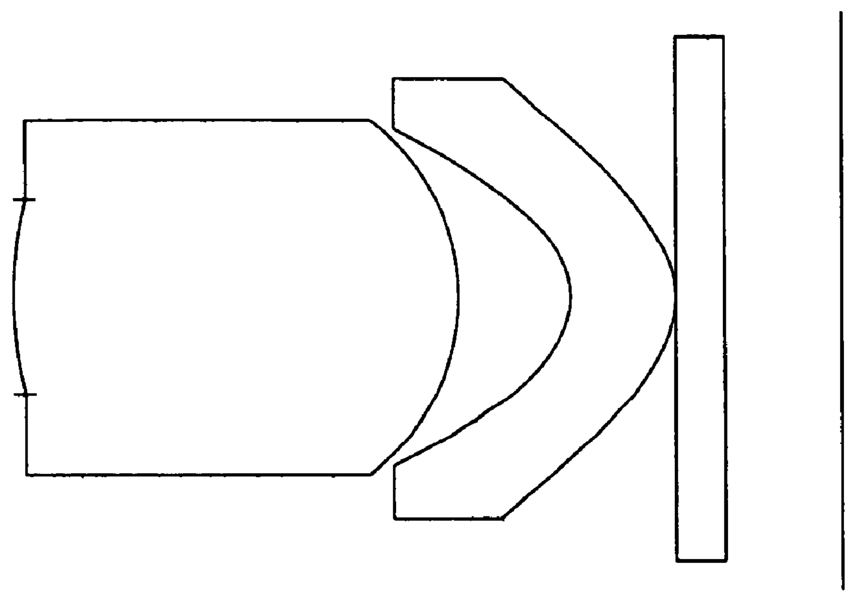
FIG. 12 is a schematic, cross-sectional view of a third exemplary embodiment of the image pick-up lens system in accordance with the present invention, and showing an image pick-up surface.
Figure 13A:
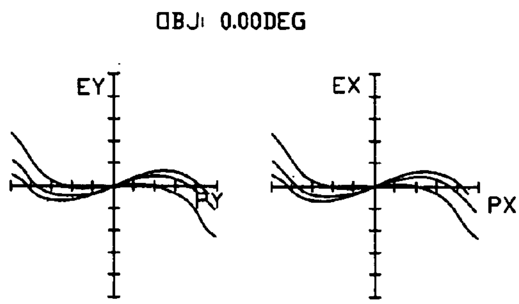
FIGS. 13–16 are graphs respectively showing transverse ray fan plots, and field curvature and distortion, longitudinal spherical aberration, and lateral chromatic aberration curves for the system in accordance with the third exemplary embodiment of the present invention.
Figure 13B:
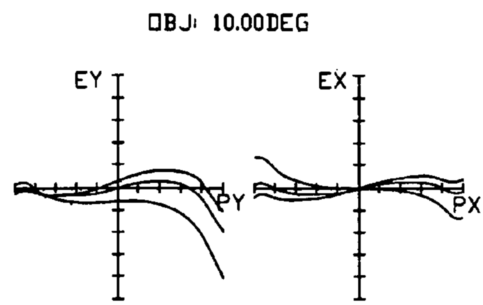
Figure 13C:
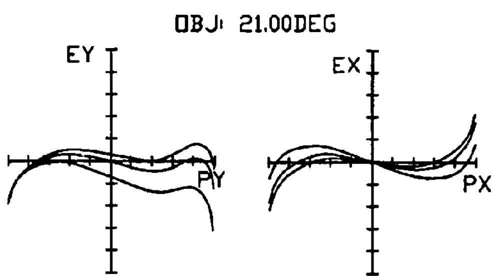
Figure 13D:
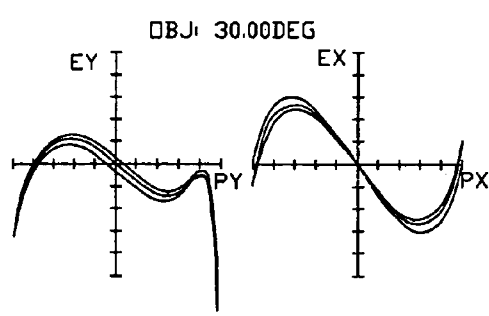
Figure 14A:
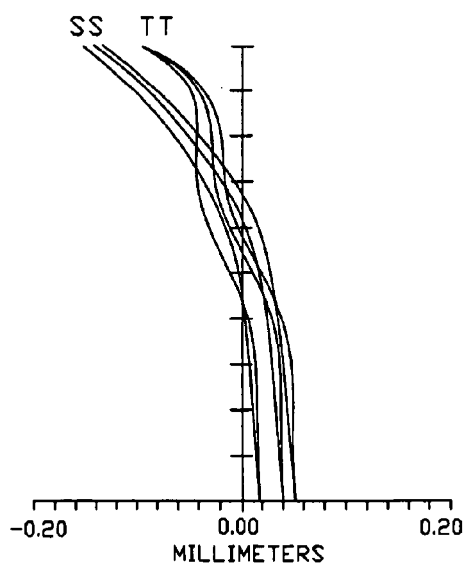
Figure 14B:
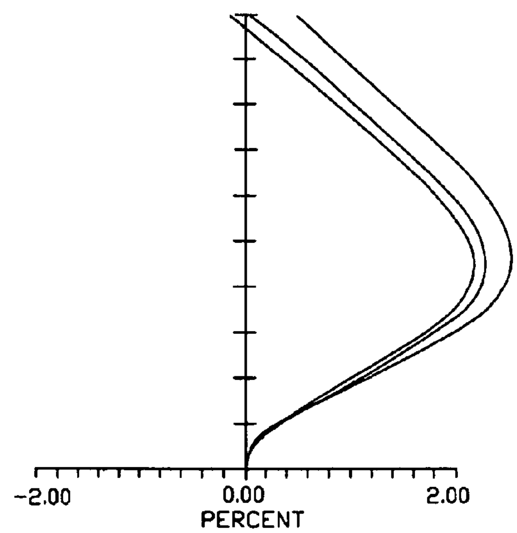
Figure 15:
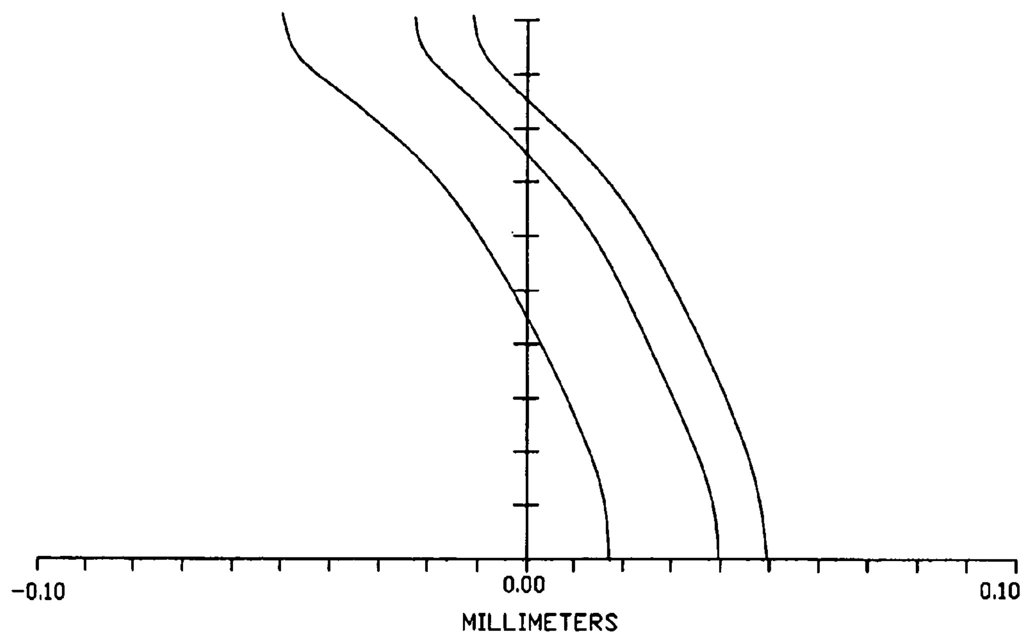
Figure 16:
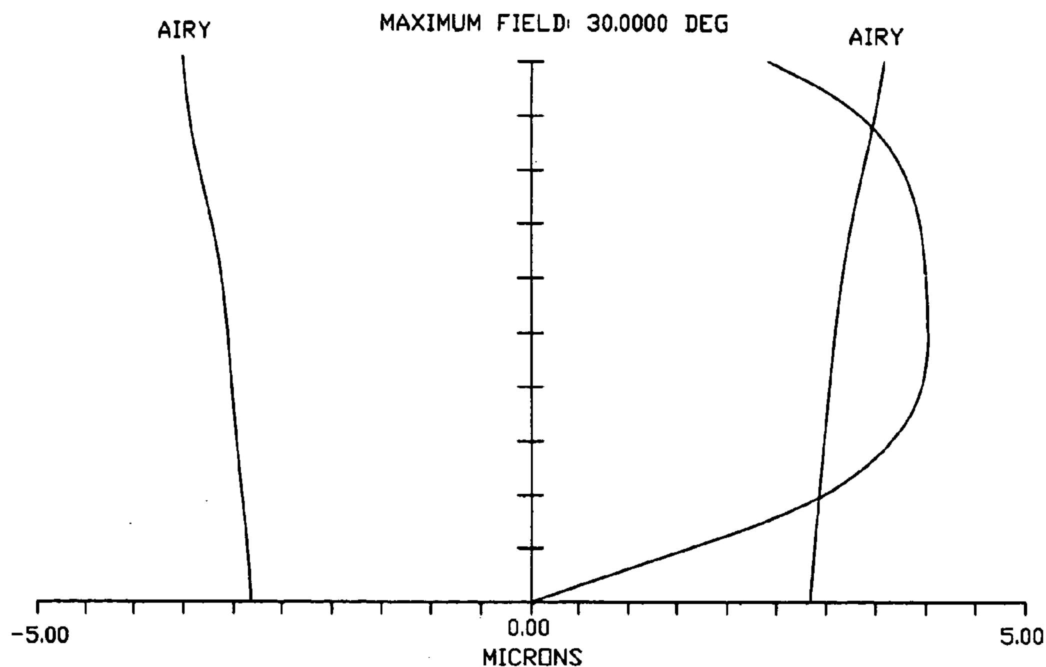
Figure 19A:
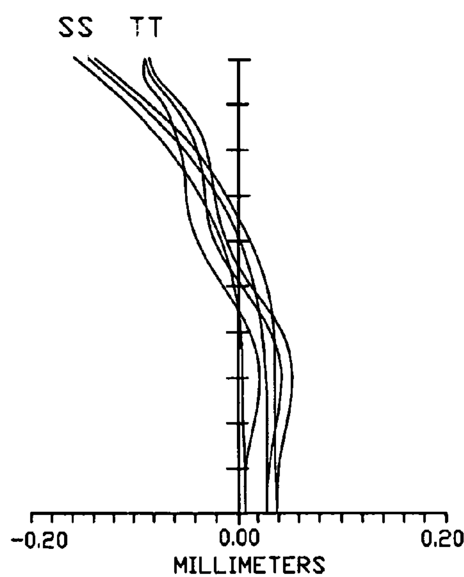
Figure 19B:
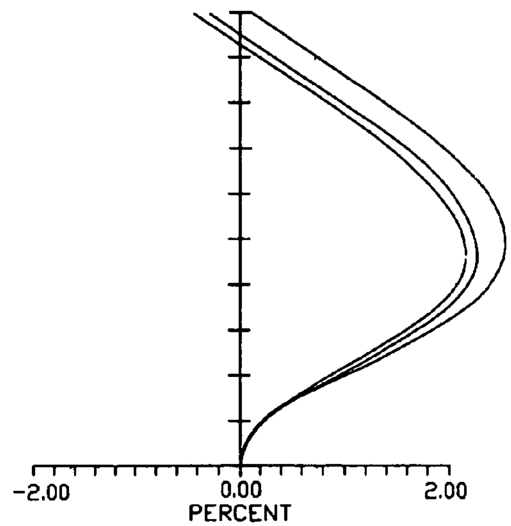
Figure 20:
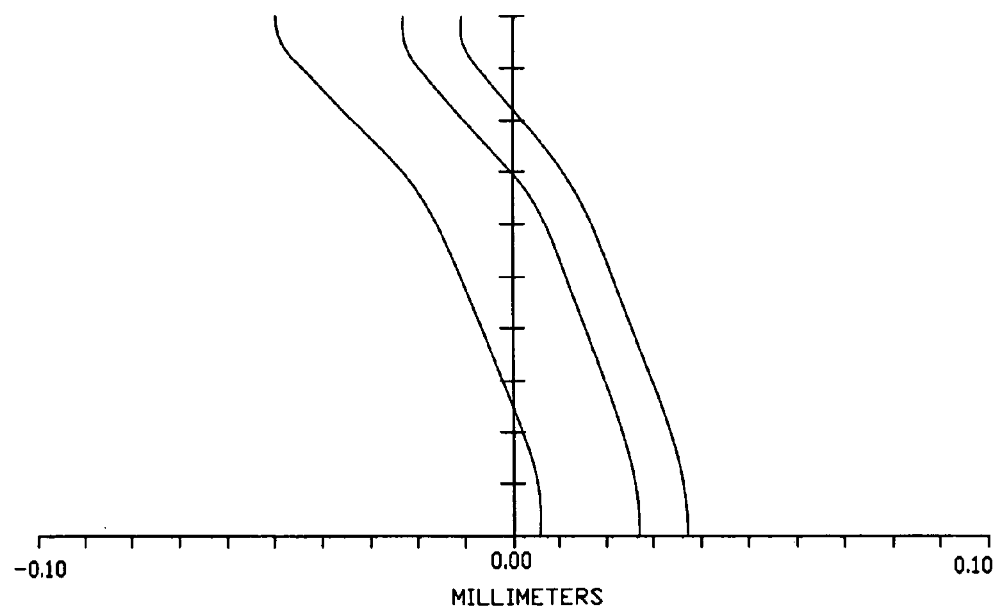
Figure 21:
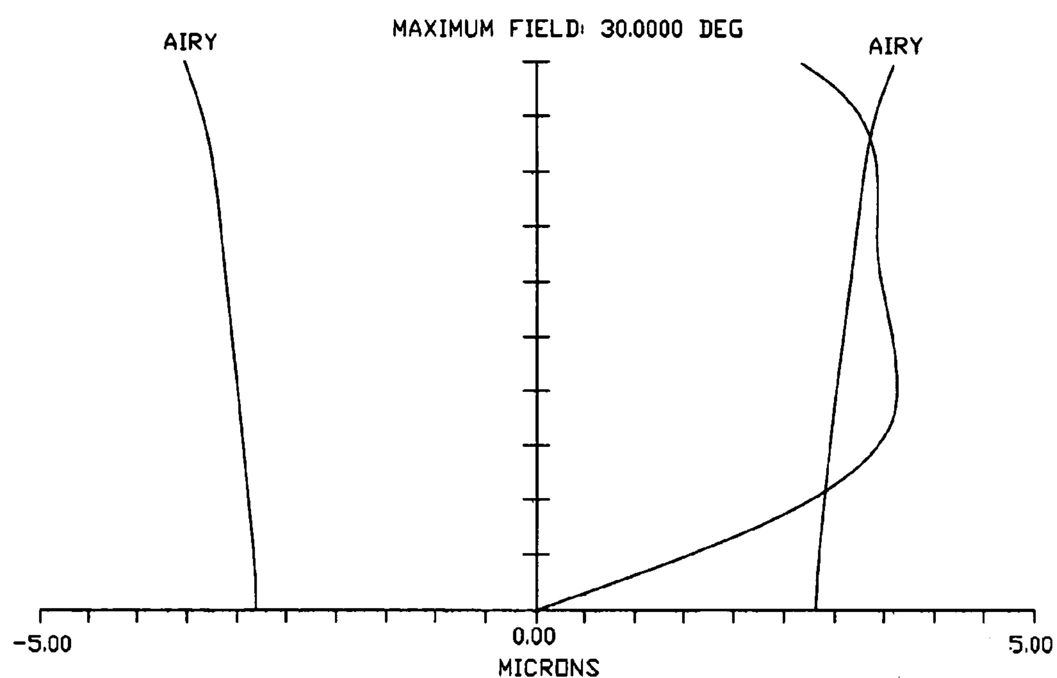

FIG. 12 shows a schematic view of a configuration of the image pick-up lens system of the third exemplary embodiment in accordance with the present invention. In Example 3, a cover glass (not labeled) is provided between the second lens 30 and the image pick-up surface 40.

Lens data of Example 3 are shown in tables 5 and 6. In the lens data shown below, e shows powers of 10; that is, for example, 2.5e−0.3 means $2.5\times10^{-3}$.

TABLE 5

| f = 4.46 mm T = 7.05 mm FNo = 2.79 ω = 30° | | | | | |
|---|---|---|---|---|---|
| Surface No. | R (mm) | D (mm) | Nd | ν | k |
| Stop 10 | infinite | −0.09 | | | 0 |
| 1st surface | 3.462822 | 3.785781 | 1.496997 | 81.608364 | 0.5101366 |
| 2nd surface | −1.686576 | 0.9489968 | | | −0.2335709 |
| 3rd surface | −0.6487525 | 0.8828307 | 1.585470 | 29.909185 | −1.091741 |
| 4th surface | −0.9551057 | 0 | | | −1.386666 |

TABLE 6

| Surface No. | 1st surface | 2nd surface | 3rd surface | 4th surface |
|---|---|---|---|---|
| Aspherical coefficient | A2 = 0 | A2 = 0 | A2 = 0 | A2 = 0 |
| | A4 = −0.0050599727 | A4 = 0.031009584 | A4 = 0.035719209 | A4 = −0.0036614338 |
| | A6 = −0.01463713 | A6 = −0.0026971901 | A6 = −0.0092987665 | A6 = 0.00069053362 |
| | A8 = 0.025966687 | A8 = −0.00059112297 | A8 = −0.0019103237 | A8 = 0.00022229649 |
| | A10 = −0.023355697 | A10 = 0.00015895902 | A10 = −0.00085381151 | A10 = 1.7727614e−005 |
| | A12 = 0.005350561 | A12 = −5.858711e−005 | A12 = 0.00032377983 | A12 = −4.5290758e−006 |
| | A14 = 0 | A14 = 0 | A14 = 0 | A14 = 0 |
| | A16 = 0 | A16 = 0 | A16 = 0 | A16 = 0 |

FIGS. 13–16 are graphs of aberrations (transverse ray fan plots, and field curvature/distortion, longitudinal spherical aberration and lateral chromatic aberration curves) of the image pick-up lens system of Example 3. FIGS. 13A–13D respectively show aberrations curves of meridional/sagittal sections in 0°, 10°, 21° and 30° field angles. FIGS. 14A and 14B respectively show field curvature and distortion curves. The first lens 20 is made from the FCD1 type of molding glass available from Japanese Hoya Corporation, and the second lens 30 is made from a polycarbonate.

FIG. 17 shows a schematic view of a configuration of the image pick-up lens system of the fourth exemplary embodiment in accordance with the present invention. In Example 4, a cover glass (not labeled) is provided between the second lens 30 and the image pick-up surface 40.

Lens data of Example 4 are shown in tables 7 and 8. In the lens data shown below, e shows powers of 10; that is, for example, 2.5e−0.3 means $2.5\times10^{-3}$.

TABLE 7

| f = 4.46 mm T = 7.01 mm FNo = 2.80 ω = 30° | | | | | |
|---|---|---|---|---|---|
| Surface No. | R (mm) | D (mm) | Nd | ν | k |
| Stop 10 | infinite | −0.09 | | | 0 |
| $1^{st}$ surface | 3.410157 | 3.716203 | 1.496997 | 81.608364 | −5.10627 |
| $2^{nd}$ surface | −1.609497 | 0.9245996 | | | −0.4144603 |
| $3^{rd}$ surface | −0.6514009 | 0.9735279 | 1.585470 | 29.909185 | −1.137316 |
| $4^{th}$ surface | −0.9914493 | 0 | | | −1.344199 |

TABLE 8

| Surface No. | $1^{st}$ surface | $2^{nd}$ surface | $3^{rd}$ surface | $4^{th}$ surface |
|---|---|---|---|---|
| Aspherical coefficient | A2 = 0 | A2 = 0 | A2 = 0 | A2 = 0 |
| | A4 = 0.0122935 | A4 = 0.039989694 | A4 = 0.027461411 | A4 = 0.0057776875 |
| | A6 = −0.016802499 | A6 = −0.018622154 | A6 = 0.0065014539 | A6 = 0.0023323134 |
| | A8 = 0.025966687 | A8 = 0.011750242 | A8 = −0.015726478 | A8 = −0.00044293716 |
| | A10 = −0.023355697 | A10 = −0.004918192 | A10 = 0.0012193742 | A10 = −0.00031149294 |
| | A12 = 0.005350561 | A12 = 0.00070059463 | A12 = 0.00082727652 | A12 = 7.6191119e−005 |
| | A14 = 0 | A14 = 0 | A14 = 0 | A14 = 0 |
| | A16 = 0 | A16 = 0 | A16 = 0 | A16 = 0 |

FIGS. 13–21 are graphs of aberrations (transverse ray fan plots, and field curvature/distortion, longitudinal spherical aberration and lateral chromatic aberration curves) of the image pick-up lens system of Example 4. FIGS. 18A–18D respectively show aberrations curves of meridional/sagittal sections in 0°, 10°, 21° and 30° field angles. FIGS. 19A and 19B respectively show field curvature and distortion curves. The first lens 20 is made from the FCD1 type of molding glass available from Japanese Hoya Corporation, and the second lens 30 is made from a polycarbonate.

Figure 22:
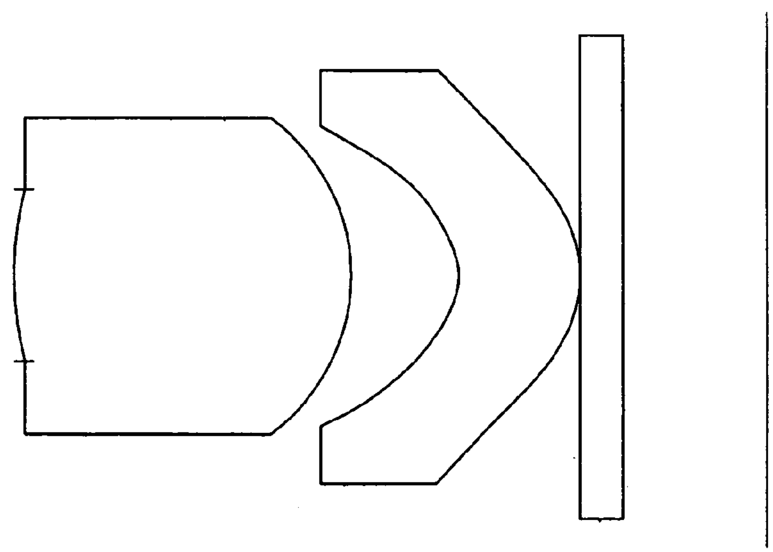
FIG. 22 is a schematic, cross-sectional view of a fifth exemplary embodiment of the image pick-up lens system in accordance with the present invention, and showing an image pick-up surface.
Figure 23A:
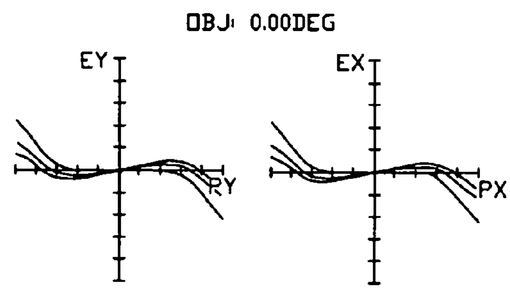
FIGS. 23–26 are graphs respectively showing transverse ray fan plots, and field curvature and distortion, longitudinal spherical aberration, and lateral chromatic aberration curves of the system in accordance with the fifth exemplary embodiment of the present invention.
Figure 23B:
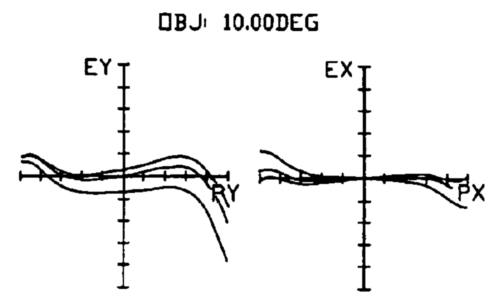
Figure 23C:
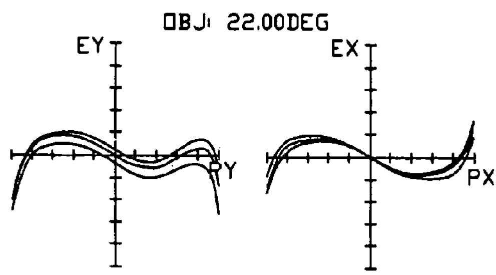
Figure 23D:
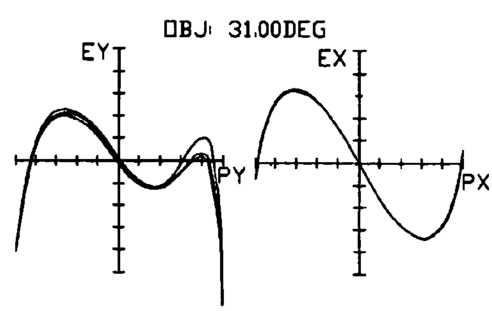
Figure 24A:
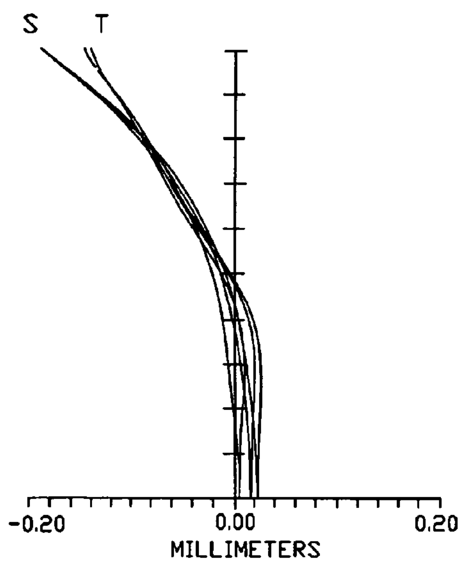
Figure 24B:
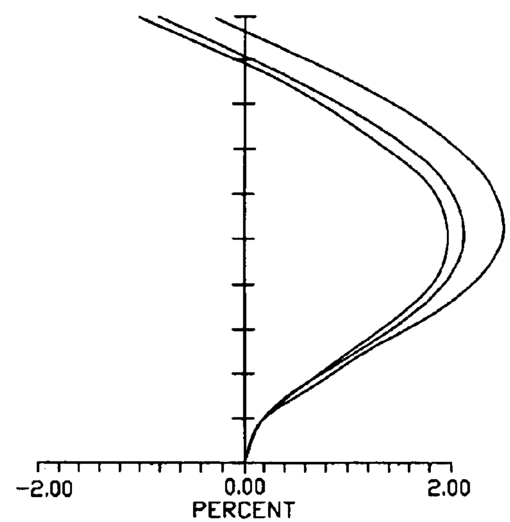
Figure 25:
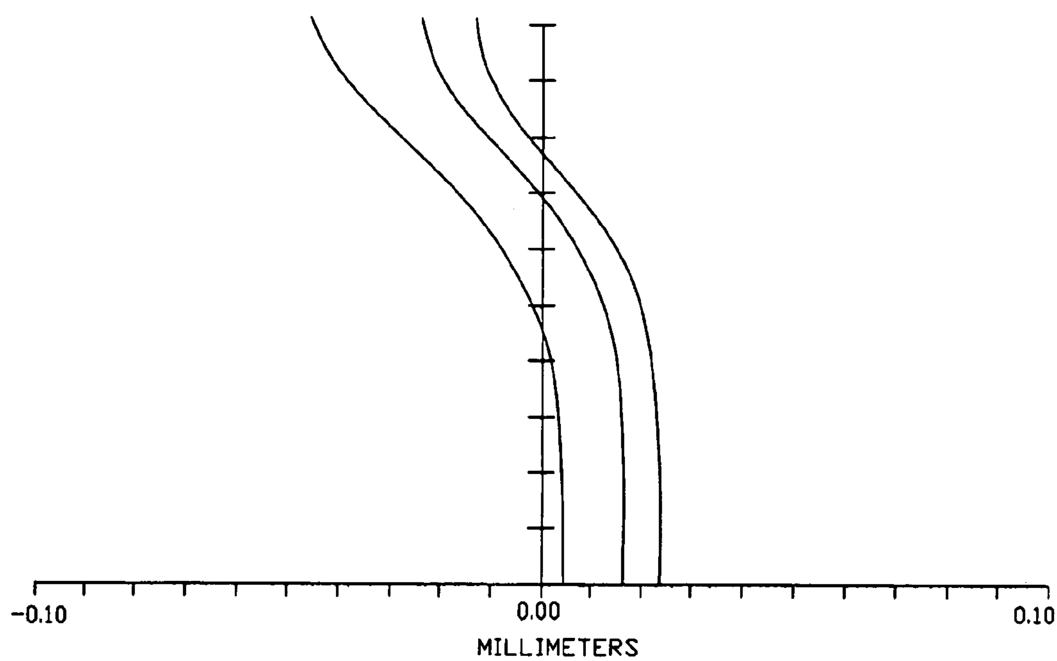
Figure 26:
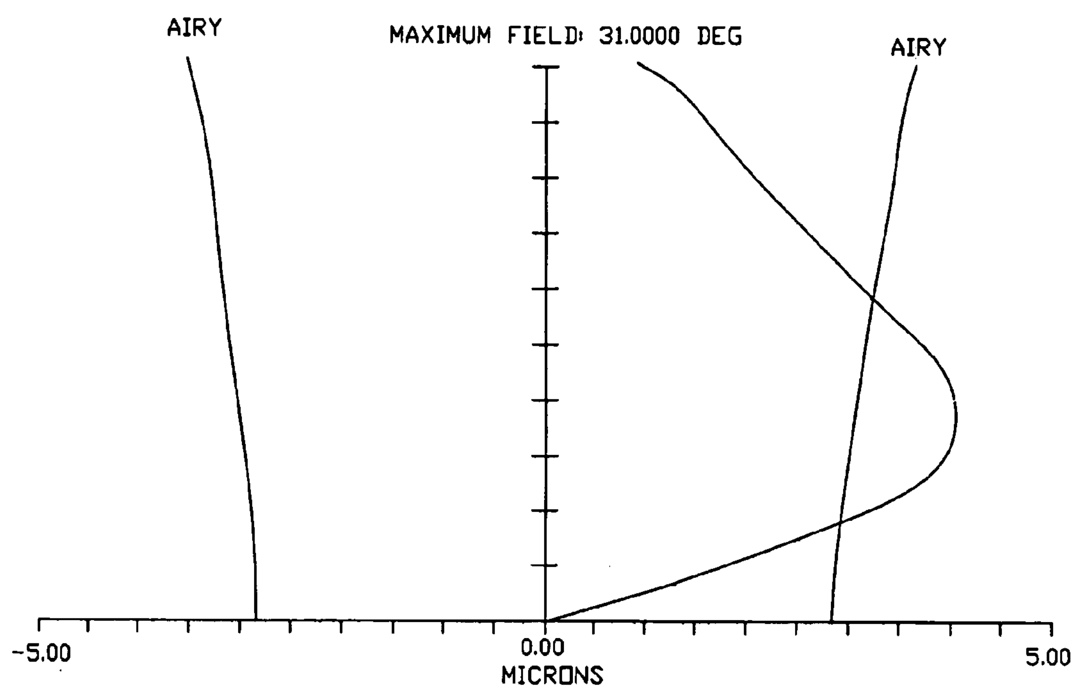

FIG. 22 shows a schematic view of a configuration of the image pick-up lens system of the fifth exemplary embodiment in accordance with the present invention. In Example 5, a cover glass (not labeled) is provided between the second lens 30 and the image pick-up surface 40.

Lens data of Example 5 are shown in tables 9 and 10. In the lens data shown below, e shows powers of 10; that is, for example, 2.5e−0.3 means $2.5\times10^{-3}$.

TABLE 9

| f = 4.30 mm T = 6.87 mm FNo = 2.80 ω = 31° | | | | | |
|---|---|---|---|---|---|
| Surface No. | R (mm) | D (mm) | Nd | ν | k |
| Stop 10 | infinite | −0.04006291 | | | 0 |
| $1^{st}$ surface | 4.132705 | 3.074009 | 1.496997 | 81.608364 | 13.59677 |
| $2^{nd}$ surface | −1.531602 | 0.965965 | | | −0.3490901 |
| $3^{rd}$ surface | −0.7339076 | 1.098618 | 1.597314 | 23.00000 | −1.000488 |
| $4^{th}$ surface | −1.149647 | | | | −1.177203 |

TABLE 10

| Surface No. | $1^{st}$ surface | $2^{nd}$ surface | $3^{rd}$ surface | $4^{th}$ surface |
|---|---|---|---|---|
| Aspherical coefficient | A2 = 0 | A2 = 0 | A2 = 0 | A2 = 0 |
| | A4 = −0.039404486 | A4 = 0.032166426 | A4 = 0.047352596 | A4 = 0.013284711 |
| | A6 = −0.015043129 | A6 = −0.003411954 | A6 = 0.017798966 | A6 = 0.0012294905 |
| | A8 = 0.0076237726 | A8 = −0.0003807005 | A8 = −0.021812864 | A8 = 0.00015505766 |
| | A10 = −0.032973278 | A10 = 0.00014202835 | A10 = 0.0028602227 | A10 = −0.00042006021 |

TABLE 10-continued

| Surface No. | 1st surface | 2nd surface | 3rd surface | 4th surface |
|---|---|---|---|---|
| | A12 = 0.0081555017<br>A14 = 0<br>A16 = 0 | A12 = 1.020076e−005<br>A14 = 0<br>A16 = 0 | A12 = 0.00064491481<br>A14 = 0<br>A16 = 0 | A12 = 7.4746818e−005<br>A14 = 0<br>A16 = 0 |

FIGS. 23–26 are graphs of aberrations (transverse ray fan plots, and field curvature/distortion, longitudinal spherical aberration and lateral chromatic aberration curves) of the image pick-up lens system of Example 5. FIGS. 23A–23D respectively show aberrations curves of meridional/sagittal sections in 0°, 10°, 22° and 31° field angles. FIGS. 24A and 24B respectively show field curvature and distortion curves. The first lens 20 is made from the FCD1 type of molding glass available from Japanese Hoya Corporation, and the second lens 30 is made from the polycarbonate marketed under the brand name Lexan-HF by U.S. General Electric Company.

Table 11 compares focal lengths and other parameters across Examples 1 through 5.

TABLE 11

| | Embodiment | | | | |
|---|---|---|---|---|---|
| | 1 | 2 | 3 | 4 | 5 |
| FNo | 2.8 | 2.8 | 2.79 | 2.8 | 2.8 |
| ω (°) | 30 | 30 | 30 | 30 | 31 |
| incident angle of chief rays | 21 | 20 | 20 | 20 | 20 |
| T (mm) | 6.59 | 6.98 | 7.05 | 7.01 | 6.87 |
| F (mm) | 4.46 | 4.46 | 4.46 | 4.46 | 4.29 |
| T/f | 1.48 | 1.57 | 1.58 | 1.57 | 1.6 |
| f1/f | 0.68 | 0.64 | 0.68 | 0.65 | 0.64 |
| R2/R1 | 0.53 | 0.46 | 0.49 | 0.47 | 0.37 |
| d/R2 | 1.85 | 2.27 | 2.24 | 2.31 | 2.01 |
| (1/R3)/(1/R1 + 1/R2 + 1/R4) | 0.74 | 0.78 | 0.8 | 0.8 | 0.77 |
| ν1–ν2 | 61.4 | 58.5 | 51.7 | 51.7 | 58.6 |

As seen in the above-described Examples, the present invention provides a law-cost image pick-up lens system with a field angle of at least 60°. The total length of the system is small, and the system appropriately corrects fundamental aberrations. The system can be used in products having over 1,000,000 pixels resolution.

It is to be understood that the invention may be embodied in other forms without departing from the spirit thereof. Thus, the present exemplary embodiments are to be considered in all respects as illustrative and not restrictive, and the invention is not to be limited to the details given herein.

What is claimed is:

1. An image pick-up lens system comprising:

an aperture stop;

a biconvex first lens; and a meniscus-shaped second lens having a concave surface on a side of an object, wherein, the aperture stop, the first lens and the second lens are aligned in that order from the object side to an image side, each of the lenses has at least one aspheric surface, at least one of the first and second lenses is made from an optical glass, and the following condition is satisfied:

$$1<T/f<1.6, \quad (1)$$

where f is a focal length of the system, and T is a length from the aperture stop to an image pick-up surface of the image side.

2. The image pick-up lens system in accordance with claim 1, wherein the first lens is aspheric on both convex surfaces thereof, and the following condition is satisfied:

$$d/R2>1.6, \quad (2)$$

where R2 is an absolute value of a radius of curvature of the first lens on the image side, and d is a thickness of the first lens.

3. The image pick-up lens system in accordance with claim 2, wherein the first lens further satisfies the following conditions:

$$0.6<f1/f0.8, \text{ and} \quad (3)$$

$$0.1<R2/R1<0.8, \quad (4)$$

where f1 is a focal length of the first lens, and R1 is an absolute value of a radius of curvature of the first lens on the object side.

4. The image pick-up lens system in accordance with claim 3, wherein the second lens is aspheric on both the concave surface thereof and an image side surface thereof, and the following condition is satisfied:

$$0.7<(1/R3)/(1/R1+1/R2+1/R4)<0.9, \quad (5)$$

where R3 is an absolute value of a radius of curvature of the second lens on the object side, and R4 is an absolute value of a radius of curvature of the second lens on the image side.

5. The image pick-up lens system in accordance with claim 1, wherein the first lens is made from an optical glass, and the second lens is made from a plastic or a resin.

6. The image pick-up lens system in accordance with claim 5, wherein the following condition is satisfied:

$$\nu1-\nu2>35, \quad (6)$$

where ν1 is the Abbe constant of the first lens, and ν2 is the Abbe constant of the second lens.

7. The image pick-up lens system in accordance with claim 5, wherein the first lens is made from a molded glass.

8. The image pick-up lens system in accordance with claim 5, wherein the plastic is a polycarbonate.

9. The image pick-up lens system in accordance with claim 1, wherein the aperture stop is formed on a surface of the first lens at the object side.

10. An image pick-up lens system comprising:

an aperture stop;

a biconvex first lens; and a meniscus-shaped second lens having a concave surface on a side of an object, wherein, the aperture stop, the first lens and the second lens are aligned in that order from the object side to an image side, each of the lenses has at least one aspheric surface, at least one of the lenses is made from an optical glass, anti the following condition is satisfied:

$$d/R2>1.6, \text{ and} \quad (1)$$

$$\nu1-\nu2>35, \quad (2)$$

where d is a thickness of the first lens, R2 is an absolute value of a radius of curvature of the first lens on the image side, ν1 is the Abbe constant of the first lens, and ν2 is the Abbe constant of the second lens.

11. The image pick-up lens system in accordance with claim 10, wherein the system satisfies the following condition:

$$1<T/f<1.6, \quad (3)$$

where T is a length from the aperture stop to an image pick-up surface of the image side, and f is a focal length of the system.

12. The image pick-up lens system in accordance with claim 10, wherein the first lens is aspheric on both convex surfaces thereof, and the following conditions are satisfied:

$$0.6<f1/f<0.8, \text{ and} \quad (4)$$

$$0.1<R2/R1<0.8, \quad (5)$$

where f1 is a focal length of the first lens, f is a focal length of the system, and R1 is an absolute value of a radius of curvature of the first lens on the object side.

13. The image pick-up lens system in accordance with claim 12, wherein the second lens is aspheric on both the concave surface thereof and an image side surface thereof, and the following condition is satisfied:

$$0.7<(1/R3)/(1/R1+1/R2+1/R4)<0.9, \quad (6)$$

where R3 is an absolute value of a radius of curvature of the second lens on the object side, and R4 is an absolute value of a radius of curvature of the second lens on the image side.

14. The image pick-up lens system in accordance with claim 10, wherein the first lens is made from an optical glass, and the second lens is made from a plastic or a resin.

15. The image pick-up lens system in accordance with claim 10, wherein the aperture stop is formed on a surface of the first lens at the object side.

16. An image pick-up lens system comprising:

an aperture stop;

a first lens disposed next to said aperture stop; and a second lens disposed next to said first lens and aligned with said aperture stop and said first lens, one side of said second lens facing said first lens, and an opposite side of said second lens facing an image pickup surface;

wherein each of said first and second lenses has at least one aspheric surface, and at least one of the following conditions is satisfied:

$$1<T/f<1.6; \quad (1)$$

$$d/R2>1.6; \quad (2)$$

wherein f is a focal length of said lens system, T is a length from said aperture stop to said image pick-up surface, d is a thickness of said first lens, and R2 is an absolute value of a radius of curvature of a side of said first lens opposing said second lens.

17. The image pick-up lens system in accordance with claim 16, wherein at least one of said first and second lenses is made of an optical glass.

18. The image pick-up lens system in accordance with claim 16, wherein said aperture stop is formed on a surface of said first lens opposite from a side of said first lens facing said second lens.

* * * * *